May 9, 1972   A. S. PATIL   3,661,755

NOVEL ELECTROCHEMICAL CELL FOR PRODUCING OXIDIZERS

Filed Sept. 23, 1970

Arvind S. Patil
INVENTOR

BY *William W. McDowell Jr.*
ATTORNEY

United States Patent Office 3,661,755
Patented May 9, 1972

3,661,755
NOVEL ELECTROCHEMICAL CELL FOR PRODUCING OXIDIZERS
Arvind S. Patil, Silver Spring, Md., assignor to W. R. Grace & Co., New York, N.Y.
Filed Sept. 23, 1970, Ser. No. 74,715
Int. Cl. B01k 3/00
U.S. Cl. 204—271                                    9 Claims

ABSTRACT OF THE DISCLOSURE

A dip-type electrochemical cell for the electrolysis of salt solutions, particularly halogen salt solutions. Said electrochemical cell comprising at least one anode and at least one cathode wherein the ratio of the total active anode surface area to the total active cathode surface area is within the range of about .1 to about 10, but most preferably 1; and preferably having a non-porous plastic housing comprising separate chambers for the electrodes. Said electrodes are composed of a non-corroding conducting material which can withstand highly alkaline or acidic conditions on a continuous basis.

---

The present invention relates to the construction of a dip-type electrochemical cell for the electrolysis of halide (i.e., chloride, bromide and/or iodide) salt solutions, and more particularly for the production of oxidizers such as sodium hypochlorite for washing operations.

The prior art comprises a number of types of electrolytic cells for generating chlorine by the electrolysis of salt solutions. A diaphragm cell is one of the common types in use and in this cell a porous diaphragm separates one section of the cell containing an iron or steel cathode from another section of the cell containing a graphite anode. There are disadvantages of using diaphragm cells because they are expensive, in some cases quite fragile and require constant maintenance of the diaphragm.

Two types of cells have become known for the electrolytic decomposition of alkali metal chlorides by the amalgam method, one in which the mercury cathode is horizontal and the other in which it is vertical. Both types of cells have the disadvantage that a very large amount of mercury has to be used to operate the cells.

The diaphragm and mercury cells described above are designed for the generation and collection of chlorine gas. Pumping of the brine solution past the electrodes is necessary so that the amount of solution in contact with the electrode is constantly limited and the least solubilization of chlorine gas occurs. The electrochemical cell of this invention is specifically designed to solubilize all or most of the chlorine gas that is generated thereby resulting in production of hypochlorite solutions. Pumping of brine solutions past the electrodes is not necessary in the cell of the present invention.

Generally stated, the present invention relates to the construction of a rugged and inexpensive, dip-type electrochemical cell for the electrolysis of salt solutions, and more particularly, for the production of oxidizers such as sodium hypochlorite for washing systems. Said cell does not require a diaphragm and therefore necessitates very little maintenance.

The cell construction according to this invention is characterized by having at least one anode and at least one shorter cathode, wherein the total active surface area of the anode to the total active surface area of the cathode is within the range of from about .1:1 to about 10:1, and most preferably 1:1; the term "active surface area" meaning the surface area exposed to the electrolyte solution. Preferably, the cell construction according to this invention is characterized by having a central anode and two side cathodes, one on each side of the anode, approximately half the length of the anode, and almost completely immersed in the electrolyte solution with all electrodes lying substantially in a common plane. However, any arrangement of cathodes about the anode is operable. It is also preferred to provide a housing for the cell comprising separate chambers for the electrodes; such as a central long rectangular compartment for the anode, and two side compartments, one on each side of the central anode compartment, half the length of the anode compartment and of the same width. In this arrangement, all three compartments lie in the same vertical plane, and the tops or upper extremities of the electrodes all lie in the same horizontal plane.

The cathode compartments are attached to the side partitions of the central anode compartment thereby separating the electrodes from each other on all sides except at the bottom. Each compartment has a vent on top for the escape of anodic and cathodic gases, respectively.

The cell of the present invention is designed to achieve the maximum desired electrolysis result. The shorter cathodes are designed to facilitate the escape of hydrogen gas, evolved at the cathodes, whereas the longer anode causes increased solubilization of chlorine (or other halogen) gas to produce hypochlorite, hypoiodite and/or hypobromite solution.

In order to achieve the optimum electrolysis result with the cell of this invention the ratio of the depth of the anode within the electrolyte solution to that of the cathode within the electrolyte solution should be within a range of from about 5 to about 1, and preferably about 2. It is also preferred for maximum efficiency that the distance between the electrodes be as small as possible.

The electrode geometry as described above affords many operable cathode-anode variations, and minimizes the resistance of the electrolyte solution employed in electrolysis, thereby allowing attainment of high electrochemical efficiencies.

The electrodes employed in the construction of the electrolysis cell of this invention have substantially vertical working surfaces and can be constructed of such materials as graphite, titanium, a noble metal of the platinum group, or a deposit of a noble metal of the platinum group on titanium, or on another noble metal such as tantalum, in order to prevent electrode corrosion in highly alkaline conditions and in the presence of wet chlorine, bromine or iodine.

The electrochemical cell as constructed in accordance with this invention requires a minimum of maintenance, is rugged, economical and achieves high electrochemical efficiencies. It can be easily adapted to various types of washing operations in which an oxidizing agent such as chlorine and/or hypochlorite is desired for such purposes as disinfecting, deodorizing and bleaching.

The electrochemical cell construction of this invention will be further understood from the following description taken in connection with the accompanying drawings, in which.

Figure 1:
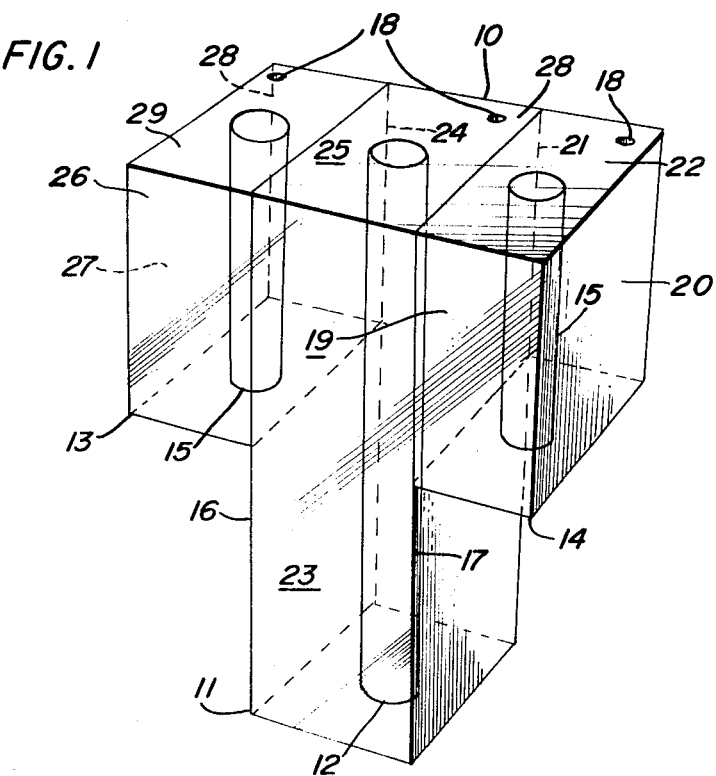
FIG. 1 is a schematic drawing of the structure of the electrochemical cell of this invention.

FIG. 1 illustrates the electrochemical cell of this invention. Electrochemical cell 10 comprises a central long rectangular compartment 11 housing anode 12, and two side compartments 13 and 14, one on each side of the central anode compartment 11, half the length of anode compartment 11, and either of the same width as said anode compartment or smaller, housing cathodes 15.

Anode compartment 11, and cathode compartments 13 and 14 lie in the same horizontal and vertical planes. Cathode compartment 14 having front wall 19, side wall 20, rear wall 21, and top wall 22 are connected to anode side wall 17 so that cathode front wall 19 and anode front wall 23 lie in the same vertical plane, thereby forming a compartment which is enclosed on 5 sides and open at the bottom. Part of the sidewall 16 and 17 may be opened below cathode chamber 13 and 14 to reduce the voltage drop across the electrolyte (known in the electrochemical art as the "IR drop") should that be appreciable. Cathode compartment 13 having front wall 26, side wall 27, back wall 28 and top wall 29 is connected to anode side wall 16 so that cathode front wall 26 and anode front wall 23 lie in the same vertical plane, thereby forming a compartment which is enclosed on 5 sides and open at the bottom. Anode compartment 11 has rear wall 24 in the same vertical plane as cathode compartment rear walls 21 and 28, and top wall 25 in same horizontal plane as cathode top walls 22 and 29. Anode compartment 11 is also enclosed on 5 sides and open at the bottom. Portion of sidewalls 16 and 17 below cathode chamber 13 and 14 may be opened to reduce IR drop. Each compartment has vent 18 on top for escape of anodic, if any, and cathodic gases.

Figure 2:
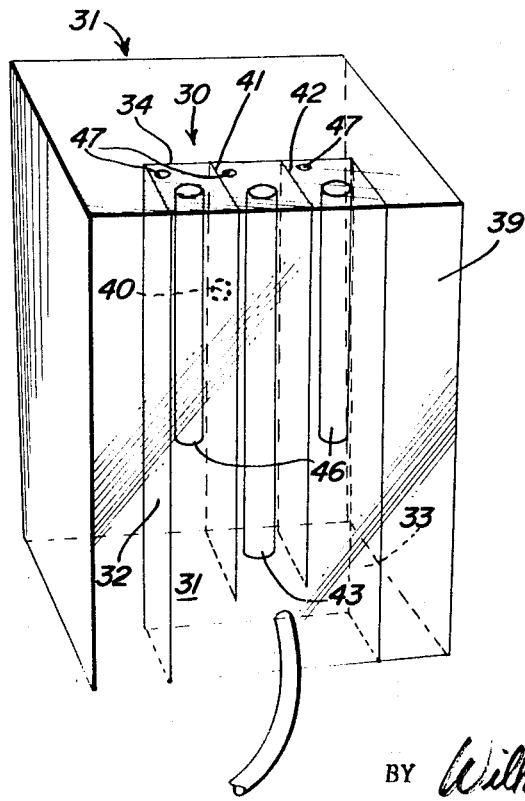
FIG. 2 is a front-view drawing of the electrochemical cell of this invention incorporated into a salt solution reservoir for the production of oxidizers for washing systems.

FIG. 2 illustrates the electrochemical cell of this invention incorporated into a salt solution reservoir for the production of oxidizer. The electrochemical cell 30, located in salt solution reservoir 31, consists of a large rectangular compartment having side walls 32 and 33, and rear wall 34. A portion of front wall 39 of the salt solution reservoir also forms the front wall of the cell. Partition walls 41 and 42 form chambers which house central anode 43, and cathodes 46. Salt solution enters electrolysis compartment 30 through small opening 40 near the upper end of rear cell wall 34. Electrolysis of a small volume of salt solution occurs in electrolysis compartment 30 enabling production of oxidizer at a very high concentration. Vents 47 are provided for escape of any anodic gases and of the cathodic gases. The oxidizer is discharged into the washing system by means of a delivery hose connected to the upper end of the front wall of the electrolysis compartment. If the distribution of oxidizer over larger volume is required, rear wall 34 is eliminated.

The salt solutions which can be used in the electrolysis cell of this invention depend on the oxidizer desired. However, the preferred salt solutions are solutions of oxidizer salts such as alkaline earth metal and alkali metal salts of chlorine, bromine and iodine and mixtures thereof.

The electrochemical cell of this invention is constructed of a rugged clear acrylic plastic known as Lucite, trademark for a series of acrylic resins by Du Pont de Nemours & Co., Inc. However, any non-corroding, non-porous resin or plastic could be used in constructing the cell of this invention.

Many modifications of above cells are possible that embody the same principles, namely one longer anode to bring about maximum solubilization on oxidizer produced and one or more shorter cathode to get rid of hydrogen. The walls between the cathode and the anode chambers are designed to keep the products of electrolysis at the respective electrodes apart to minimize the size reactions. However, if the anode is sufficiently short, it is possible to merely suspend these in solution at a certain minimum distance without any separating wall between them.

Utilizing the same principle it is possible to construct a cell where there are more than 2 short cathodes surrounding a central anode. Similarly more than one long anode can be arranged with two or more short cathodes within the range of ratios of surface area mentioned before.

The surface area of the anodes and cathodes should be such that current densities beyond 0.1 amp per square centimeter are not used in order to get current efficiencies above 85–90% (the current efficiencies are based on the available chlorine that is solubilized).

EXAMPLE 1

The electrochemical cell of the present invention was incorporated into a salt solution reservoir, as illustrated in FIG. 2. The salt solution compartment having a capacity of 8 liters and the electrolysis compartment were filled with a sodium chloride solution. The anode employed in the cell had a surface area of 101 cm.$^2$ and extended 25 centimeters into the salt solution. The two shorter cathodes were approximately equal in surface area to the anode and extended 12½ centimeters into the salt solution. An electrolysis current of 10 amperes at voltage of 6.6 volts was passed across the electrodes.

The electrochemical cell was energized and oxidizer production was allowed to continue for one-half hour. During this time the salt solution was continually replenished as the oxidizer was discharged from the electrolysis compartment. The electrochemical cell generated 6,000 parts per million of available chlorine in 1,000 milliliters of solution (in contact with the electrodes) with 90% current efficiency. (Chloroine concentration was determined by standard titration procedures.)

EXAMPLE 2

The identical procedure described in Example 1 was followed for generating hypobdomite. The salt solution reservoir having a capacity of 8 liters and the electrolysis compartment were filled with a saturated solution of sodium bromide. The electrochemical cell generated 12,000 parts per million of available bromine in 1000 milliliters of solution with 80% current efficiency. (Bromine concentration was determined by standard titration procedures.)

EXAMPLE 3

The identical procedure described in Example 1 was followed by generating hypoiodite. The salt solution reservoir having a capacity of 8 liters and electrolysis compartment were filled with a saturated solution of sodium iodide. The electrochemical cell generated 750 parts per million of available iodine at 340 milliamperes current in 1,000 milliliters of solution with 94% current efficiency. (Iodine concentration was determined by standard titration procedures.)

EXAMPLE 4

The identical procedure described in Example 1 was followed for generating a mixture of hypochlorite and hypoiodite. The salt solution reservoir having a capacity of 8 liters and the electrolysis compartment were filled with a saturated solution of sodium chloride and sodium iodide wherein said salts are in a one to one ratio. The electrochemical cell generated 9000 parts per million of available mixed oxidizer in 1000 ml. of solution. (Oxidizer concentration was determined by standard titration procedures.)

It is to be understood that the foregoing detailed description is given merely by way of illustration and that many variations may be made therein without departing from the spirit of scope of this invention.

What is claimed is:

1. An electrochemical cell comprising in combination, an anode and two cathodes, said cathodes being shorter than said anode and disposed on each side of the anode substantially parallel to one another, and wherein the ratio of the total active surface area of the anode to the total active surface area of the cathodes is within the range of from about 0.1 to about 10, a housing for the cell comprising a central long rectangular compartment for the anode, and two side compartments, one on each side of the anode compartment for each cathode, each compartment open at the bottom and having a vent on top for the escape of anodic and cathodic gases.

2. The electrochemical cell of claim 1 including a housing comprising separate chambers for the electrodes.

3. The electrochemical cell of claim 2 wherein the housing is constructed of a non-porous acrylic resin.

4. The electrochemical cell of claim 1 wherein the ratio of depth of the anode within an electrolyte solution to the depth of the cathode in the electrolyte is within the range of from about 5 to about 1.

5. The electrochemical cell of claim 4 wherein the depth ratio is about 2.

6. The electrochemical cell of claim 1 wherein the ratio of total active surface area is within the range of from about 1 to about 10.

7. The electrochemical cell of claim 6 wherein the ratio of total active surface area is 1.

8. The electrochemical cell of claim 7 wherein the ratio of the depth of the anode in the electrolyte solution to the depth of the two shorter cathodes in the electrolyte solution is about 2.

9. The electrochemical cell of claim 8 wherein the housing for the cell comprises a central long rectangular compartment for the anode, and two side compartments, one on each side of the anode compartment, half the length of the anode compartment, of the same width and lying in the same vertical plane, each compartment open at the bottom and having a vent on top for the escape of anodic and cathodic gases.

References Cited
UNITED STATES PATENTS

| | | | |
|---|---|---|---|
| 1,359,002 | 11/1920 | Thomas | 204—258 |
| 1,485,706 | 3/1924 | Plauson | 204—103 |
| 3,223,242 | 12/1965 | Murray | 204—266 |

JOHN H. MACK, Primary Examiner

W. I. SOLOMON, Assistant Examiner

U.S. Cl. X.R.

204—95, 266